Oct. 13, 1964

H. E. McGUIRE 3,153,196

OPTIMUM CODING TECHNIQUE

Filed April 19, 1962

2 Sheets-Sheet 1

INVENTOR.
HUBERT E. McGUIRE
BY Julian C. Renfro
ATTORNEY

Oct. 13, 1964 H. E. McGUIRE 3,153,196

OPTIMUM CODING TECHNIQUE

Filed April 19, 1962 2 Sheets-Sheet 2

INVENTOR.
HUBERT E. McGUIRE
BY Julian C. Renfro
ATTORNEY

United States Patent Office 3,153,196
Patented Oct. 13, 1964

3,153,196

OPTIMUM CODING TECHNIQUE

Hubert E. McGuire, Orlando, Fla., assignor to Martin-Marietta Corporation, Baltimore, Md., a corporation of Maryland Filed Apr. 19, 1962, Ser. No. 188,829
5 Claims. (Cl. 325—143)

This invention relates to transmitter blanking systems and more particularly to a transmitter blanking system which may be used to reduce the band width required to transmit position modulated pulses.

In developing communications systems and techniques to meet ever increasing needs and requirements, optimum frequency spectrum utilization has become quite important. The most efficient utilization of the spectrum possible must be made and numerous developments have been made in an effort to obtain the practical minimum band width required for the transmission of speech.

One such development is the use of pulse position modulation for transmitting speech. However, even pulse position modulation systems of the prior art do not approach maximum utilization of a band width because transmission continues during breaks and pauses in speech. K. Bullington and J. M. Fraser published an article in the Bell Technical Journal, March 1959 relating to the use factor of telephone lines. Statistics presented in this article indicate that the average circuit is active only 37 percent of the off-the-hook time. This indicates that the system capacity could be increased by a factor of approximately 2½ if transmission occurs only when voice energy is present.

One approach to the problem of increasing system capacity has been to use a voice operated switch. The switch passes keying pulses to the transmitter only when voice energy is present. One example of a voice operated switch is that shown in the application of Charles H. Schulman, entitled "Modulation Operated Switch," filed September 5, 1961, Serial No. 136,075 and assigned to the assignee of the present invention. However, a voice operated switch is not suitable for all applications because problems arise in determining an acceptable pull-in energy level and in providing a drop-out time compatible with all variations in speaker characteristics such as rapidity of speaking, length of pauses, and dynamic range of amplitudes.

Accordingly, it is an important object of the present invention to provide a transmitter blanking system which interrupts transmission during short pauses and breaks in the speech to be transmitted regardless of the rapidity of speech, length of pauses or dynamic range of amplitudes of the speech.

Recently, pulse position modulation systems have been developed in which a transmitter keying pulse occurs in the middle of repetitive time frames when there is no modulating speech. The presence of modulating speech causes the keying pulse to occur slightly before the middle of the time frame or slightly after the middle of the time frame in accordance with the amplitude and polarity of the modulating speech. A pulse position modulator of this type is shown in the pending application Serial No. 107,194, filed May 2, 1961 to McKay Goode and entitled "Discrete Address Communications System with Random Capabilities."

In such a system it is not necessary to transmit any synchronizing or time reference pulses. A demodulator suitable for demodulating the pulses which are transmitted without reference signals is shown in the pending application Serial No. 120,635, to Humbert M. Fernandez, filed June 29, 1961, and entitled "Nonreference Pulse Position Demodulator." In systems of this type the PPM pulses are disposed about a zero point at the middle of the repetitive time frames, and excursions of the pulses from this zero point represent positive and negative amplitudes of the modulating signals. Each time that the modulating signal passes through zero, a PPM pulse occurs at the middle of the time frame. These zero crossover pulses convey no useful information. The zero crossover pulses are redundant and transmission of these pulses increases the band width required by the system. It is desirable to suppress the zero crossover pulses in order to reduce the band width requirements.

Accordingly, it is a further object of the present invention to provide a transmitter blanking system which suppresses pulses occurring during zero crossovers in addition to interrupting transmission during short pauses and breaks.

In accordance with one embodiment of the invention, a transmitter blanking circuit is provided for use in a transmitter of the type in which a clock provides a repetitive source of clock pulses, each of which initiates a particular time frame. In the absence of modulation, transmitter keying pulses will be generated at exactly the middle of each time frame. A positive amplitude modulating signal causes the keying pulse to occur prior to the middle of the time frame and a negative amplitude modulating signal causes the keying pulse to occur after the middle of the time frame. Whenever there is a pause in the modulating signal or whenever the modulating signal changes from a positive to a negative amplitude or from a negative to a positive amplitude, the keying pulses occur at the middle of the time frames. Since pulses occurring at the middle of the time frame are redundant, it is desirable to suppress these pulses. This is accomplished by providing a gate generator, the output of which inhibits the keying pulses. The gate is initiated by the clock pulses and the gate is phased to occur at a time corresponding to the center of each time frame. Therefore, the samples occurring at zero crossovers of the audio waveform will be inhibited as well as pulses occurring during pauses in normal speech.

A better understanding of the present invention, together with further objects and advantages thereof, may be obtained from the following more detailed description and appended claims, together with the drawings in which:

Figure 1:
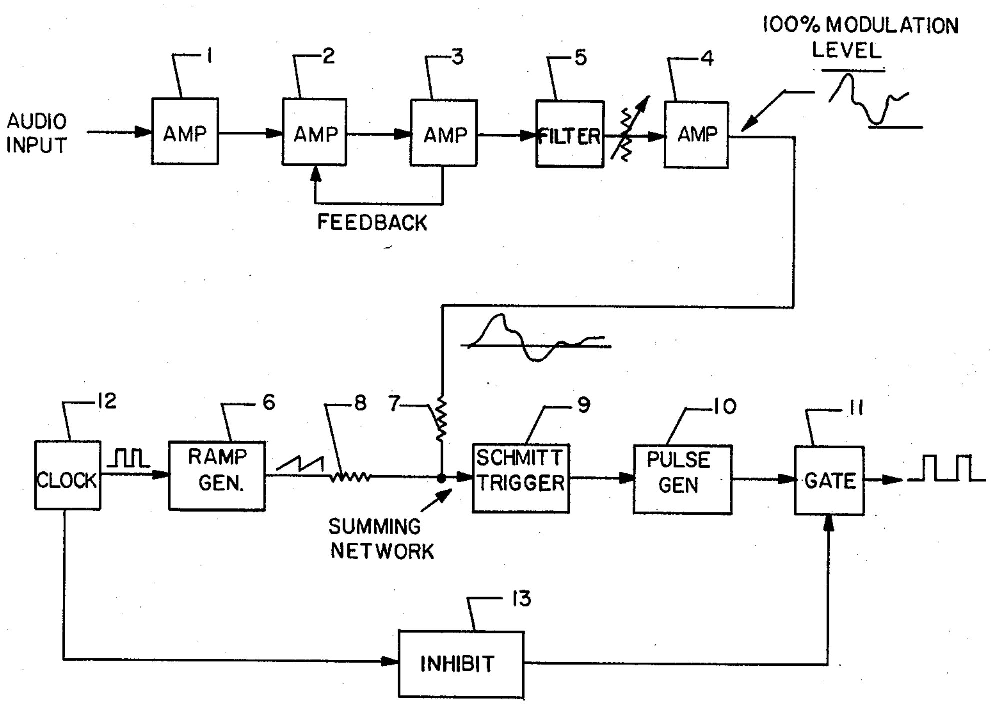
FIGURE 1 shows a block diagram of the subject system.

Referring to FIGURE 1, there is shown a PPM transmitter including the usual audio input circuitry including amplifiers 1, 2, 3, 4, and filter 5. Multiple stages of amplification and feedback between the amplifiers 3 and 2 are required to amplify the audio information and limit the peaks of the audio envelope to a fixed preselected level. The level selected corresponds to the 100 percent modulation level.

The output of audio amplifier 4 is added to the output of a ramp generator 6 in a summing network. This summing network includes the resistors 7 and 8. The result of adding the audio waveform to the ramp waveform is a waveform which passes through a given threshold level at a time dependent upon the amplitude and polarity of the audio signal. In order to detect the threshold level a Schmidt trigger 9 is provided. A positive polarity audio signal when added to the ramp waveform will exceed the threshold of Schmidt trigger 9 prior to the middle of the time frames which encompass each of the ramps in the output of ramp generator 6. Similarly, a negative-going audio signal causes the threshold of Schmidt trigger 9 to be exceeded at a time after the midpoint of the time frame. The Schmidt trigger 9 enables a pulse generator 10 which produces keying pulses to enable the transmitter.

In order to blank the keying pulses occurring at the middle of the time frames, a gate 11 is provided. The gate 11 inhibits all keying pulses which occur at the center of the time frames from passing to the transmitter.

In order to initiate the repetitive time frames, a clock 12 is provided. The output of this clock enables ramp generator 6 to produce the ramp waveforms which are summed with the audio. The clock 12 also enables an inhibit circuit 13 which are summed with the audio. The clock 12 also enables an inhibit circuit 13 which produces an inhibiting gate at the center of each time frame. This inhibiting gate is applied to the gate 11 to inhibit all keying pulses which occur at the center of the time frames.

Figure 2:
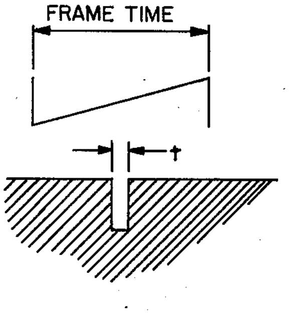
FIGURE 2 is a timing diagram showing the position of the blanking gate with respect to a single time frame.

The position of the inhibit gate produced by the inhibit circuit 13 with respect to the time frame can best be seen in FIGURE 2. FIGURE 2 shows a time frame which is initiated by a pulse from the clock 12. The time frame encompasses a complete ramp waveform of the ramp generator 6. Midway of this time frame is an inhibit gate shown in the drawings as having a width denoted by *t*.

Figure 3:
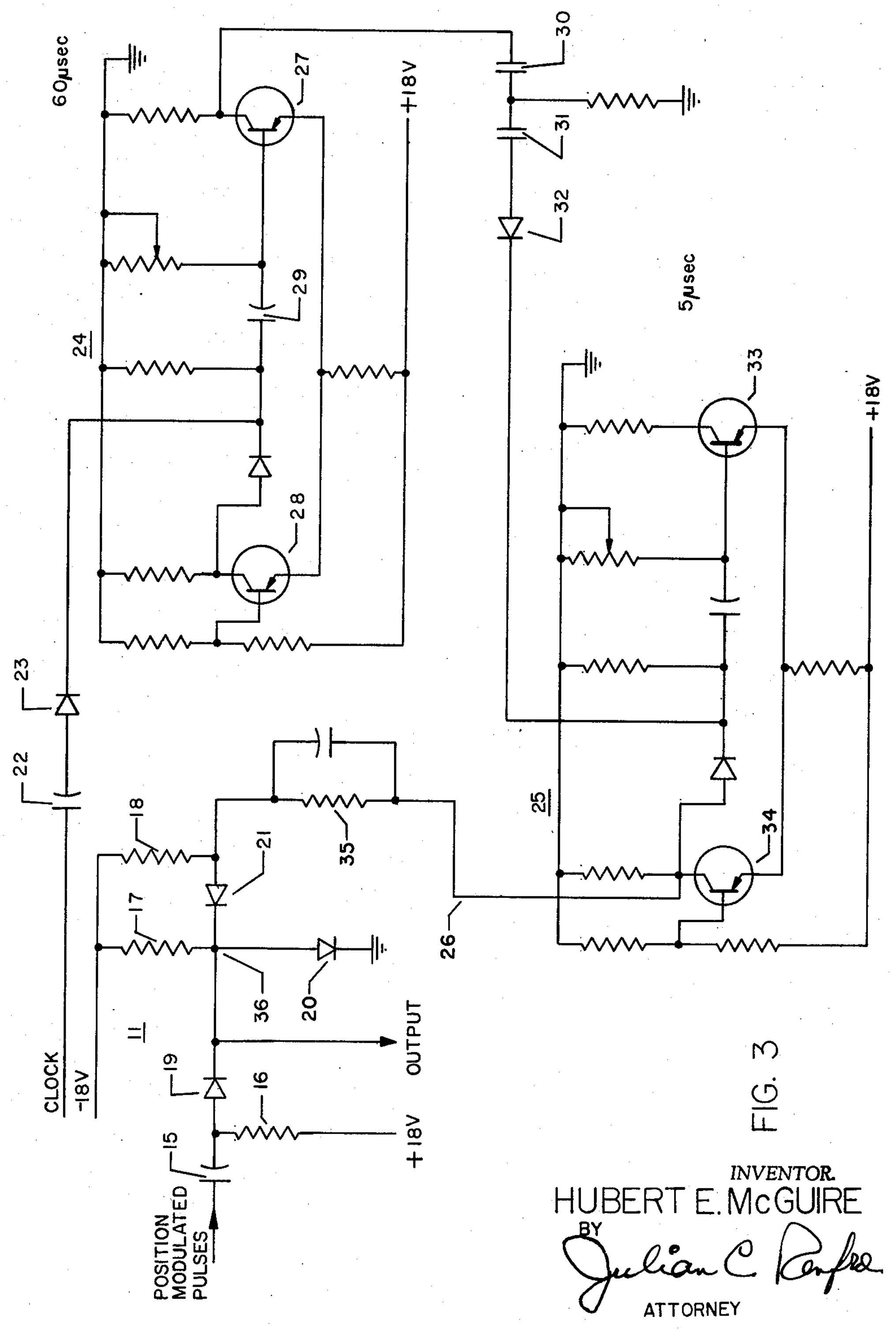
FIGURE 3 shows suitable circuitry for use in the present invention.

The details of inhibit circuit 13 and gate 11 are shown in FIGURE 3. It will be understood that the remainder of the circuitry shown in block form in FIGURE 1 is conventional and is described in more detail in the pending applications referred to previously. The output of pulse generator 10, FIGURE 1, is connected through capacitor 15 to the gate 11 which includes resistors 16, 17 and 18 and diodes 19, 20 and 21. The inhibit pulses or gating waveforms from the inhibit circuit are connected to gate 11 via gate input resistor 35, which is paralleled by a capacitor.

Clock pulses from the clock 12 are coupled through capacitor 22 and diode 23 to the inhibit circuit which includes monostable multivibrator 24 and monostable multivibrator 25. Monostable multivibrator 24 has an unstable time period equal to slightly less than half of a time frame. Monostable multivibrator 24 is triggered to its astable state by a clock pulse. Prior to the middle of the time frame, monostable multivibrator 24 returns to its stable state, thereby triggering monostable multivibrator 25. When monostable multivibrator 25 is in its astable state, a voltage is applied over line 26 to the gate 11, thereby inhibiting the passage of keying pulses to the output.

The details of monostable triggers 24 and 25 are as follows. Monostable trigger 24 includes transistor 27 and transistor 28. Transistor 27 is normally conducting and transistor 28 is normally cut off. The occurrence of a clock pulse which is coupled through capacitor 22 and diode 23 and through capacitor 29 to the base of transistor 27 tends to cut transistor 27 off. As transistor 27 is cut off, its emitter goes positive. Since there is a common emitter connection to transistor 28, the transistor 28 is turned on by this positive-going voltage. With transistor 27 cut off and transistor 28 conducting, the monostable multivibrator 24 is in its astable state and will remain in this state for a time determined by the time constant of the capacitor 29 and the resistors through which this capacitor is discharged.

When the monostable multivibrator 24 returns to its stable state, the transistor 27 conducts. When this occurs, the collector of transistor 27 goes positive. This positive-going voltage is coupled through capacitors 30 and 31 and diode 32 to trigger the monostable multivibrator 25 to its astable state. The positive-going pulse is coupled to the base of transistor 33 so as to cut that transistor off. As transistor 33 is cut off, the positive-going voltage at the emitter is connected to the emitter of transistor 34 and tends to turn that transistor on. The monostable multivibrator 25 is then in its astable state and will remain in this astable state for a time period which has been denoted as *t* in FIGURE 2.

When monostable multivibrator 25 is in its astable state, the transistor 34 is conducting and a positive voltage appears at the collector of transistor 34. This positive voltage is connected over line 26 and through resistor 35 to the anode of diode 21. This positive voltage forward biases diode 21 and, acting through diode 21, forward biases diode 20. Because diodes 21 and 20 are forward biased, the point 36 is clamped at ground. Since point 36 is clamped at ground, position modulated pulses are inhibited from passing through capacitor 15 and diode 19 to the output.

The operation of the transmitter blanking system can best be described with reference to a particular timing sequence. In this timing sequence the clock 12 produces clock pulses at an 8 kc. rate. Therefore, each time frame is 125 microseconds long. The occurrence of a clock pulse enables the ramp generator 6 and, in addition, switches the monostable multivibrator 25 to its astable condition. The monostable multivibrator 24 has a time period of 60 microseconds. After 60 microseconds, monostable multivibrator 24 returns to its stable state, thereby switching monostable multivibrator 25 to its astable state. Monostable multivibrator 25 has a time period of 5 microseconds. During the 5 microseconds that monostable multivibrator 25 is in its astable state, the gate 11 is inhibited thereby preventing the passage of keying pulses to the output. This 5 microsecond period occurs at the center of each time frame.

The use of a 5 microsecond inhibit pulse at the center of each time frame produces no measurable signal deterioration, although further increase of the inhibit gate width results in slight signal distortion. The 5 microsecond inhibit gate at the center of each time frame reduces the long time average of pulses transmitted from 8000 pulses per second to 3000 pulses per second. This reduction occurs when the modulating signal is rather rapid speech. When the modulating signal is more normal speech, the reduction in pulses per second transmitted is even greater. A reduction of pulses transmitted from 8000 pulses per second to 3000 pulses per second is a reduction to 37 percent of the original number of pulses transmitted. This reduction is equivalent to a band width of 1500 cycles per second as compared to a normally required 3700 cycles per second.

While a specific embodiment of the invention has been shown and described, it will, of course, be understood that numerous changes may be made without departing from the spirit and scope of the invention. The appended claims are, therefore, intended to cover any such modifications within the true spirit and scope of the invention.

What I claim as new and desire to secure by Letters Patent of the United States is:

1. A transmitter blanking circuit for blanking unmodulated keying pulses emanating from a pulse position modulator, said keying pulses being positioned in time frames initiated by clock pulses, said circuit comprising a source of clock pulses, means responsive to said clock pulses for producing a triggering signal preceding the middle of said time frames, means responsive to said triggering signal for producing a blanking waveform which spans the middle of said time frame, and an inhibit gate, said keying pulses and said blanking waveform being connected to said inhibit gate so that keying pulses occurring at the center of said time frame do not pass through said inhibit gate.

2. The transmitter blanking circuit recited in claim 1 wherein said means for producing a triggering signal includes a first monostable multivibrator, said clock pulses being connected to switch said first monostable multivibrator to its astable state, said first monostable multivibrator producing said triggering signal when said first monostable multivibrator returns to its stable condition, and wherein said means for producing a blanking waveform includes a second monostable multivibrator, said triggering signal being connected to switch said second monostable multivibrator to its astable state, said second monostable multivibrator being connected to inhibit the passage of said gating pulses through said inhibit gate when said second monostable multivibrator is in its astable state.

3. A blanking circuit for a pulse position modulated transmitter of the type including a source of clock pulses and a pulse position modulator producing keying pulses occurring in periodic time frames which are initiated by said clock pulses, said keying pulses being positioned on either side of the center of said time frame in accordance with the modulating signal, said keying pulses being positioned in the center of said time frame in the absence of a modulating signal, said blanking circuit comprising means for producing a first gating waveform, said first gating waveform being initiated by said clock pulses, the trailing edge of said first gating waveform occurring at a time preceding the middle of said time frame, means for producing a second gating waveform, said second gating waveform being initiated by the trailing edge of said first gating waveform, the trailing edge of said second gating waveform occurring at a time after the middle of said time frame, an inhibit gate, said keying pulses being connected to said inhibit gate, said second gating waveform being connected to said inhibit gate to block the passage of said keying pulses through said inhibit gate whereby the output of said inhibit gate contains only modulated keying pulses.

4. The blanking circuit recited in claim 3 wherein said means for producing a first gating waveform includes a first monostable multivibrator, said clock pulses being connected to trigger said first monostable multivibrator to its astable state, and wherein the means for producing a second gating waveform includes a second monostable multivibrator, the output of said first monostable multivibrator being connected to the input to said second monostable multivibrator so that said second monostable multivibrator is switched to its astable state when said first monostable multivibrator returns to its stable state.

5. The blanking circuit recited in claim 4 wherein said second monostable multivibrator has a time period which is less than $1/25$ of the time period of said time frame and wherein said first monostable multivibrator has a time period such that said second monostable multivibrator is triggered at a time such that the astable period of said second multivibrator spans the middle of said time frame.

References Cited in the file of this patent

UNITED STATES PATENTS

| | | |
|---|---|---|
| 2,547,001 | Grieg | Apr. 3, 1951 |
| 2,624,797 | Lawson et al. | Jan. 6, 1953 |